United States Patent [19]

Saarinen

[11] Patent Number: 5,571,273
[45] Date of Patent: Nov. 5, 1996

[54] MANUALLY TILTABLE SEAT

[76] Inventor: Sulevi Saarinen, Sauvalantie 1, FIN-21350 Ilmarinen, Finland

[21] Appl. No.: 417,926

[22] Filed: Apr. 6, 1995

[30] Foreign Application Priority Data

Apr. 12, 1994 [FI] Finland ................................. 941678

[51] Int. Cl.⁶ ..................................................... B62J 1/04
[52] U.S. Cl. ...................... 297/215.15; 297/313
[58] Field of Search ........................... 297/215.15, 195.1, 297/195.11, 313, 328; 108/167; 601/24, 26

[56] References Cited

U.S. PATENT DOCUMENTS

| | | | |
|---|---|---|---|
| 296,837 | 4/1884 | Jones | 297/195.1 X |
| 585,858 | 7/1897 | Wooster | 297/215.15 X |
| 2,519,963 | 8/1950 | Heffernan et al. | 297/313 |
| 2,669,283 | 2/1954 | Faulhaber . | |
| 2,928,104 | 3/1960 | Kennedy | 297/313 X |
| 3,302,970 | 2/1967 | Rizzato | 297/215.15 |
| 3,933,391 | 1/1976 | Shook . | |
| 4,275,922 | 6/1981 | July . | |
| 4,548,289 | 10/1985 | Mechling | 601/24 X |
| 4,836,604 | 6/1989 | Romano . | |
| 5,040,522 | 8/1991 | Daniels | 601/24 |
| 5,190,346 | 3/1993 | Ringle . | |
| 5,226,624 | 7/1993 | Kingsbery . | |
| 5,433,504 | 7/1995 | Kao | 297/215.15 |

FOREIGN PATENT DOCUMENTS

| | | | |
|---|---|---|---|
| 54361 | 2/1938 | Denmark . | |
| 2436061 | 4/1980 | France | 297/215.15 |
| 398759 | 7/1924 | Germany . | |
| 598748 | 6/1934 | Germany . | |
| 949450 | 9/1956 | Germany . | |
| 2632147 | 7/1976 | Germany . | |
| 267801 | 9/1929 | Italy | 297/195.1 |
| 426700 | 9/1948 | Italy | 297/195.1 |
| 610862 | 10/1960 | Italy | 297/215.15 |
| 1710044 | 2/1992 | U.S.S.R. | 601/24 |
| 12934 | of 1884 | United Kingdom | 297/215.15 |
| 28096 | of 1912 | United Kingdom | 297/328 |
| WO9418054 | 8/1994 | WIPO . | |

*Primary Examiner*—Jose V. Chen
*Assistant Examiner*—David E. Allred
*Attorney, Agent, or Firm*—Graybeal Jackson Haley & Johnson

[57] ABSTRACT

A tilt adjusting arrangement in connection with the seat of an exercise apparatus or the like, comprising a mounting bracket which is fixedly positioned at the upper end of a support tube and a seat portion which is pivotally positioned on the mounting bracket in such a way that the seat portion may pivot about a horizontal axis with respect to the support tube. Manually operable adjusting and locking components, functioning on a screw principle, adjust and lock the seat portion at a desired tilt angle with respect to the support tube without use of tools. To provide a simple indication of tilt angle for ease of adjustment and readjustment, a pointer on the seat portion and a scale part on the support tube provide a direct indication of the seat tilt angle.

4 Claims, 1 Drawing Sheet

MANUALLY TILTABLE SEAT

BACKGROUND OF THE INVENTION

The invention relates to an arrangement in connection with a seat, especially a seat of an exercise apparatus, comprising a mounting bracket, which is fixedly positioned at the upper end of a support tube of a seat portion, the seat portion, which is pivotally positioned on the mounting bracket in such a way that the seat portion may turn about an axis horizontal with respect to the support tube, and adjusting and locking means functioning on a screw principle, by which means the position of the seat portion with respect to the support tube can be adjusted and locked in a desired manner.

Arrangements like this are very general at present for instance in connection with bicycles. As an example of such solutions used in bicycles can be mentioned the ones disclosed in German Offenlegungsschrift 26 32 147 and U.S. Pat. No. 4,275,922. These known solutions have been developed expressly for bicycles and have the drawback of being complicated, due to which the costs rise too high for enabling an application to exercise apparatus. A further problem consists in that the adjustment is complicated and slow, because it has to be performed by using tools, and additionally, two screw elements have to be screwed for the adjustment.

Similar solutions are disclosed in U.S. Pat. Nos. 3,933, 391 and 5,226,624 as well. These solutions also have the drawbacks set forth above as to an application to exercise apparatus.

A further example of solutions associated with bicycles may be the solution of U.S. Pat. No. 5,190,346. The drawback of this solution likewise consists in complication and a need of tools for performing adjustments.

With regard to solutions in connection with bicycle seats, the device disclosed in U.S. Pat. No. 4,836,604 can be mentioned. According to that, no tools are needed for an adjustment of tilt of the seat portion. This structure is, however, very complicated and expensive, which is among other things due to the fact that adjustment of tilt and locking into a desired position are performed by separate means in this solution. This is a typical special solution intended for special apparatus, in this case for racing bicycles, when the costs are not of the same significance as in connection with exercise apparatus, for instance.

All applications set forth above are intended for being used in connection with bicycles. Because of the complication of the solutions, they are not actually suitable for being used in exercise apparatuses, e.g. exercise bicycles. Due to that, exercise bicycles are seldom provided with any proper and simple quick-adjustment of tilt. Additionally, all above solutions have the drawback that an advance adjustment into a desired tilt position is difficult, because the correct position has always to be searched for by adjusting, experimenting and readjusting. This is caused by the fact that, in connection with the above solutions, correct position of a seat cannot be determined in any other way than by experimenting.

SUMMARY OF THE INVENTION

The object of the invention is to obtain an arrangement by means of which the drawbacks of the prior art can be eliminated. This has been achieved by means of an arrangement according to the invention, which is characterized in that it comprises a pointer means positioned in the seat portion and a scale part positioned on a movable part with respect to the seat portion, both being arranged to act as an indicating means of a tilt angle of the seat portion, said tilt angle being obtained by means of the adjusting and locking means.

An advantage of the invention is above all that the invention makes it possible to provide a simple tilt mechanism for the seat portion, which mechanism is suitable expressly for exercise apparatus, for instance exercise bicycles. By means of the arrangement of the invention, the seat portion can preferably be ready-adjusted without any tools into a position desired by the user. Additionally, an adjustment of the seat portion can preferably be performed also during the very fitness exercise. The above facts are of essential significance in connection with exercise apparatuses. Due to its simplicity, adoption of the invention will be advantageous and the operation very safe and free of maintenance. The arrangement according to the invention can preferably be adapted also to old exercise bicycles, because the adaptation may take place in a simple way, by changing an old seat structure for an arrangement according to the invention, for instance.

BRIEF DESCRIPTION OF THE DRAWING

The invention will be explained in the following in greater detail by means of a preferred embodiment illustrated in the attached drawing, in which.

DESCRIPTION OF THE PREFERRED EMBODIMENT

Figure 1:
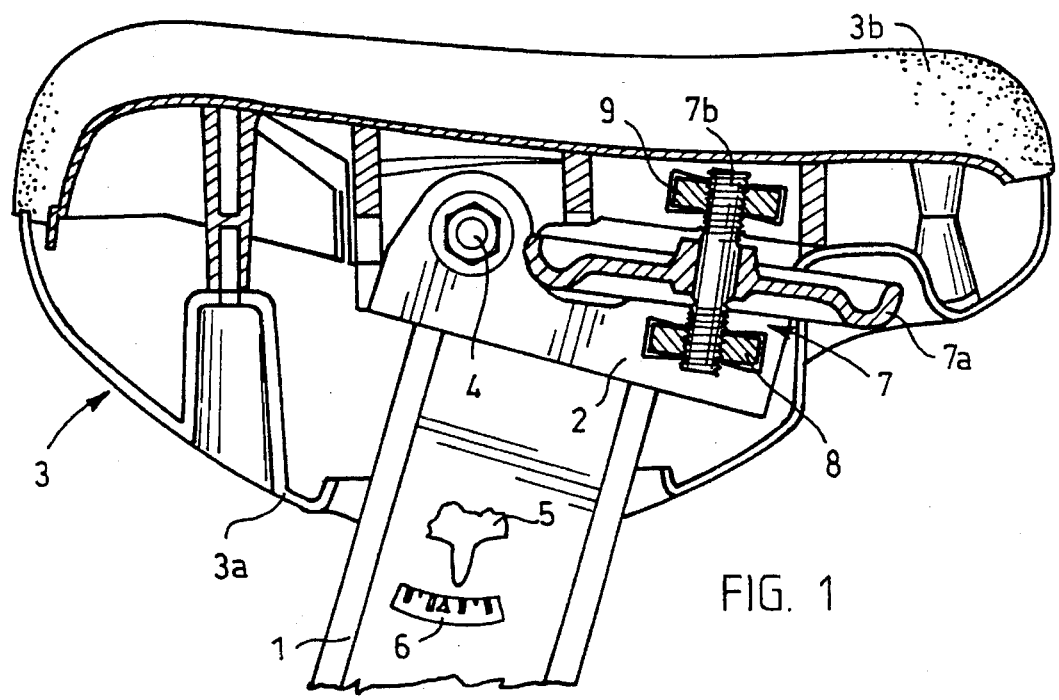
FIG. 1 shows a general side view, partially in section of an arrangement according to the invention
Figure 2:
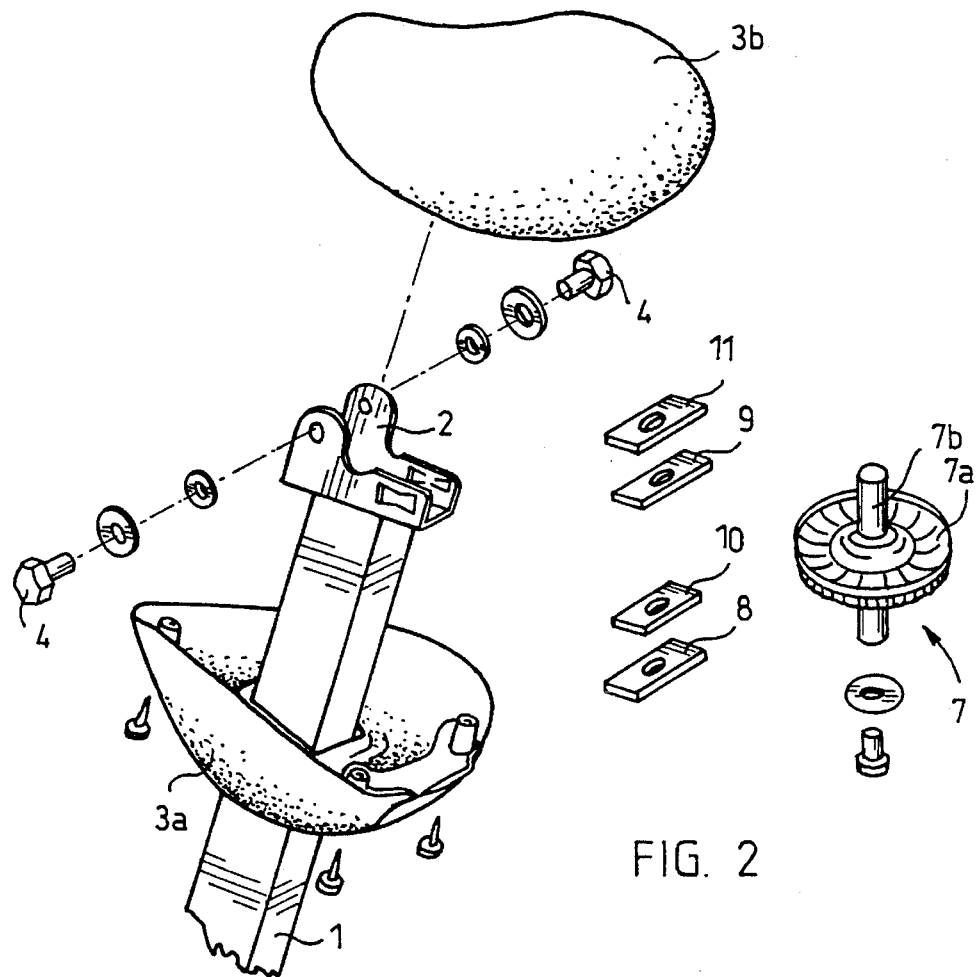
FIG. 2 shows a general exploded isometric view of the arrangement according to the invention.

FIGS. 1 and 2 show a general side and section view of a preferred embodiment of an arrangement according to the invention. Reference numeral 1 indicates a support tube 1 of a seat portion, at the upper end of which tube 1 is fixedly positioned a mounting bracket 2. The seat portion is indicated by reference numeral 3. forming a horizontal axis, by means of which the seat portion 3 is pivotally mounted on the mounting bracket 2. In this example, the seat portion 3 is constituted by a casing 3a forming its lower side and a padded part 3b forming its upper surface.

Tilt of the seat portion 3 is adjusted by adjusting and locking means 7 functioning on a screw principle in such a way that a desired tilt can be adjusted quickly and steplessly. According to the basic idea of the invention, the arrangement comprises a pointer means 5 positioned in the seat portion 3 and a scale part 6 positioned on a part immovable with respect to the tube 1. These parts are arranged to act as an indicating means of a tilt angle of the seat portion 3, the desired angle being obtained by means of the adjusting and locking means 7. The pointer means 5 may be positioned preferably in the casing 3a forming the lower side of the seat portion 3 and the scale part 6 again maybe on the support tube 1 of the seat portion 3. To provide a quick-operated and simple adjusting and locking mechanism, the adjusting and locking means 7 comprise one single screw element 7b operated by a manual adjusting wheel 7a, the screw element being arranged to engage with threads provided in the mounting bracket 2 and the seat portion 3, whereby a locking of the tilt of the seat portion 3 into a desired position is arranged to be obtained by means of self-holding capacity of the threads only. The threads can be provided in the mounting bracket 2 and the seat portion 3 simply by means of flat nuts 8 and 9, for instance. In this connection, suitable guide parts 10 and 11, shown in FIG. 2 by way of example, can naturally also be used, if necessary.

By means of the arrangement according to the figures, it is possible to obtain a steplessly operated, accurate and quick adjustment of seat tilt without tools. The adjustment takes place simply by turning the manual adjusting wheel 7b, due to which the seat portion turns about the axis constituted by the bolt 4, the pointer means 5 turns together with the seat portion 3 and the scale part 6 indicates when a desired tilt has been achieved for the situation in question. No separate opening and closing of the locking means 7 are needed, because a friction force between the threads of the screw element and the threads of the flat nuts 8, 9, i.e. the self-holding capacity of the threads, is sufficient to keep the seat portion at the desired tilt.

The above embodiment is by no means intended to restrict the invention, but the invention can be modified completely freely within the scope of the claims. Accordingly, it is clear that the invention or its details do not need to be absolutely similar to those shown in the figures, but solutions of another kind can also be used. Even if the term manual adjusting wheel has been used in connection with the adjusting and locking means, it is obvious that the term adjusting wheel shall be understood widely in this case. For instance, a member in the shape of a circular sector, a straight or curved lever or some other similar member can be used in this connection. The pointer means and the scale part may be realized in many different ways and they can also be provided with sensors, by which the indicated data may be displayed in front of the user, e.g. to the vicinity of a rate indicator of an exercise apparatus, etc. The scale part 6 may naturally be positioned also elsewhere than on the support tube 1, e.g. on the mounting bracket 2 or some other part movable with respect to the seat portion 3. Correspondingly, the pointer means can be positioned, depending on the structure of the seat, also elsewhere in the seat than in the casing forming its lower side, e.g. in support structures of the seat, etc.

I claim:
1. Arrangement in connection with a seat, especially a seat of an exercise apparatus, comprising a mounting bracket fixedly positioned at the upper end of a support tube, a seat portion, comprising an upper surface and a casing forming a lower side pivotally positioned on said mounting bracket in such a way that said seat portion may turn about a horizontal axis with respect to said support tube, and manually adjustable adjusting and locking means, functioning by two coacting threaded elements, by means of which the angular position of said seat portion with respect to said support tube can be adjusted and locked in a desired manner, said casing and said upper surface forming a cavity, said upper end, said bracket, and said adjusting and locking means being disposed in said cavity, said arrangement further comprising pointer means positioned in said seat portion and a scale part positioned on a part which is movable relative to the seat portion, both being arranged to act as an indicating means of the angle of tilt of said seat portion, said angle of tilt being obtained by means of said adjusting and locking means.

2. Arrangement according to claim 1, wherein said pointer means is positioned in a casing forming a lower side of said seat portion and said scale part is positioned on said support tube.

3. Arrangement according to claim 1, wherein said adjusting and locking means comprise one single screw element operated by a manually turnable adjusting wheel, said screw element being arranged to engage with threads in said mounting bracket and threads in said seat portion, whereby a locking of the tilt of said seat portion into a desired position is provided only by means of the self-holding capacity of said threads.

4. Arrangement according to claim 2, wherein said adjusting and locking means comprise one single screw element operated by a manually turnable adjusting wheel, said screw element being arranged to engage with threads in said mounting bracket and threads in said seat portion, whereby a locking of the tilt of said seat portion into a desired position is provided only by means of the self-holding capacity of said threads.

\* \* \* \* \*

UNITED STATES PATENT AND TRADEMARK OFFICE
CERTIFICATE OF CORRECTION

PATENT NO.   : 5,571,273
DATED        : November 5, 1996
INVENTOR(S)  : Sulevi Saarinen It is certified that error appears in the above-indentified patent and that said Letters Patent is hereby corrected as shown below:

On the title page, insert item [73]:

Assignee:   Tunturipyora Oy
               Untamonkatu 2
               Turku, Finland FIN-20520

Signed and Sealed this

Twenty-eighth Day of October, 1997

Attest:

BRUCE LEHMAN

Attesting Officer

Commissioner of Patents and Trademarks